United States Patent [19]

Vogrig

[11] Patent Number: 5,524,808
[45] Date of Patent: Jun. 11, 1996

[54] POWERED MULTIPLE RIVETER

[75] Inventor: Joseph C. Vogrig, Naperville, Ill.

[73] Assignee: Flexible Steel Lacing Company, Downers Grove, Ill.

[21] Appl. No.: 233,079

[22] Filed: Apr. 26, 1994

[51] Int. Cl.$^6$ ..................................................... B25D 1/00
[52] U.S. Cl. .......................... 227/147; 227/59; 227/156; 29/243.51
[58] Field of Search ................................ 227/147, 8, 58, 227/59, 156, 111; 29/243.51

[56] References Cited

U.S. PATENT DOCUMENTS

| | | | |
|---|---|---|---|
| 3,913,180 | 10/1975 | Pray | 24/31 |
| 4,074,843 | 2/1978 | Oesterle | 227/8 |
| 4,171,083 | 10/1979 | Lippacher et al. | 227/147 |
| 4,440,336 | 4/1984 | Kifor | 227/4 |
| 4,519,536 | 5/1985 | Steigauf | 227/147 |
| 4,620,657 | 11/1986 | Gladding et al. | 227/147 |
| 4,688,711 | 8/1987 | Gladding et al. | 227/147 |
| 5,170,922 | 12/1992 | Ehmig et al. | 227/8 |
| 5,263,842 | 11/1993 | Fealey | 227/8 |

OTHER PUBLICATIONS

Undated Aerosmith instruction manual for the Bulknailer 50 and Feeder C–50.
Undated Aerosmith Construction Brochure entitled "The Versatile Tool for Fast Nailing of Loose and Collated Steel Pins".

*Primary Examiner*—Rinaldi I. Rada
*Assistant Examiner*—Allan M. Schrock
*Attorney, Agent, or Firm*—Fitch, Even, Tabin & Flannery

[57] ABSTRACT

Illustrated and described is a nailing gun conversion for use in driving and setting rivets to attach belt fasteners to conveyor belts and the like. The conversion involves a special nose piece and drive rod for the gun for cooperation with the modified head of a multiple pronged rivet driver used for the simultaneous driving and setting of a cluster of nail-pointed self-setting rivets maintained in position for assembly with the belt fasteners and belt by a fixture of known construction.

8 Claims, 4 Drawing Sheets

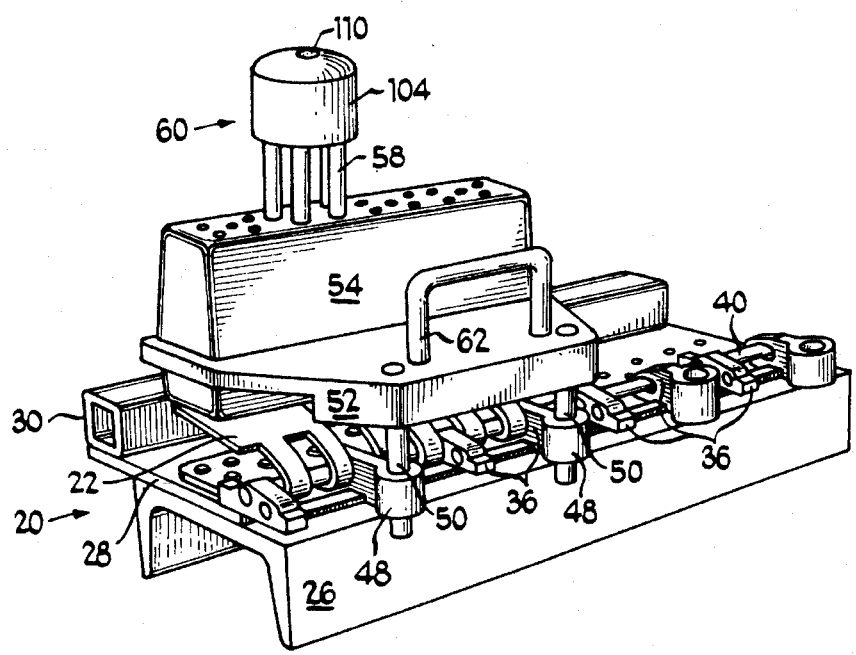
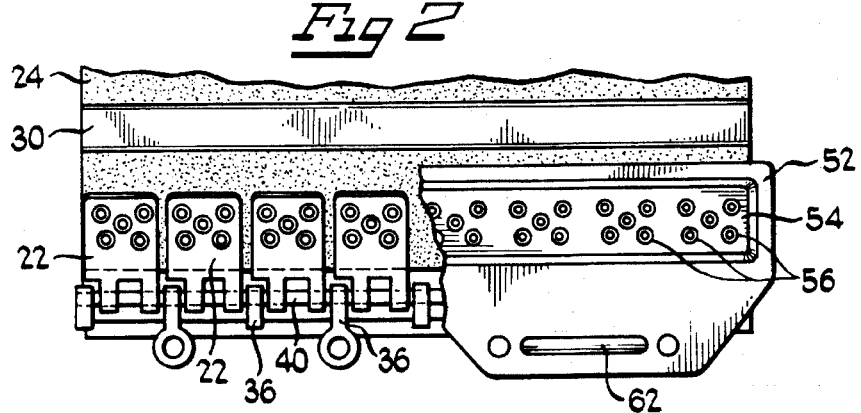
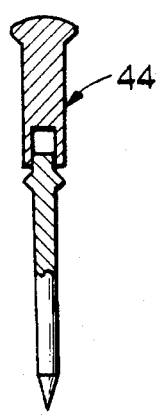
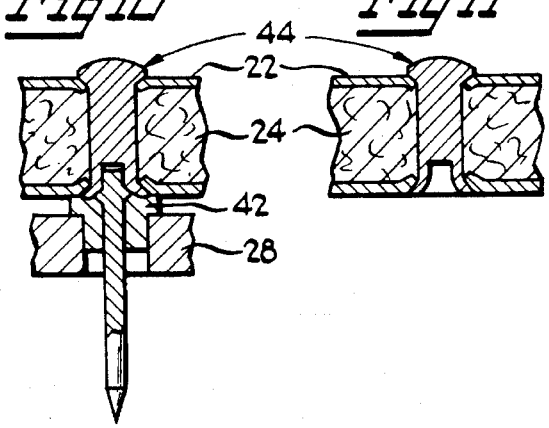

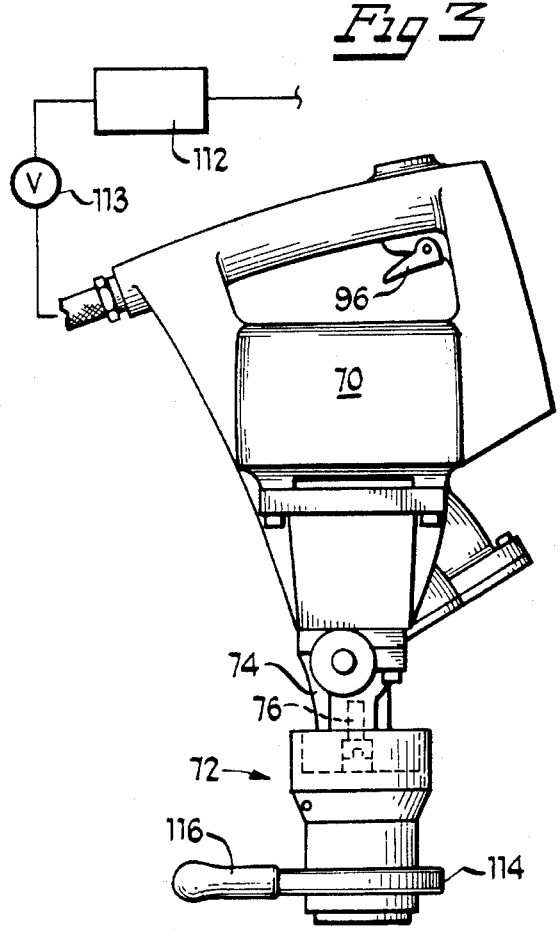
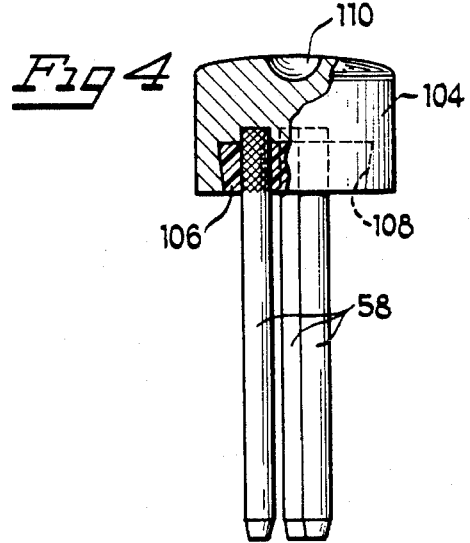
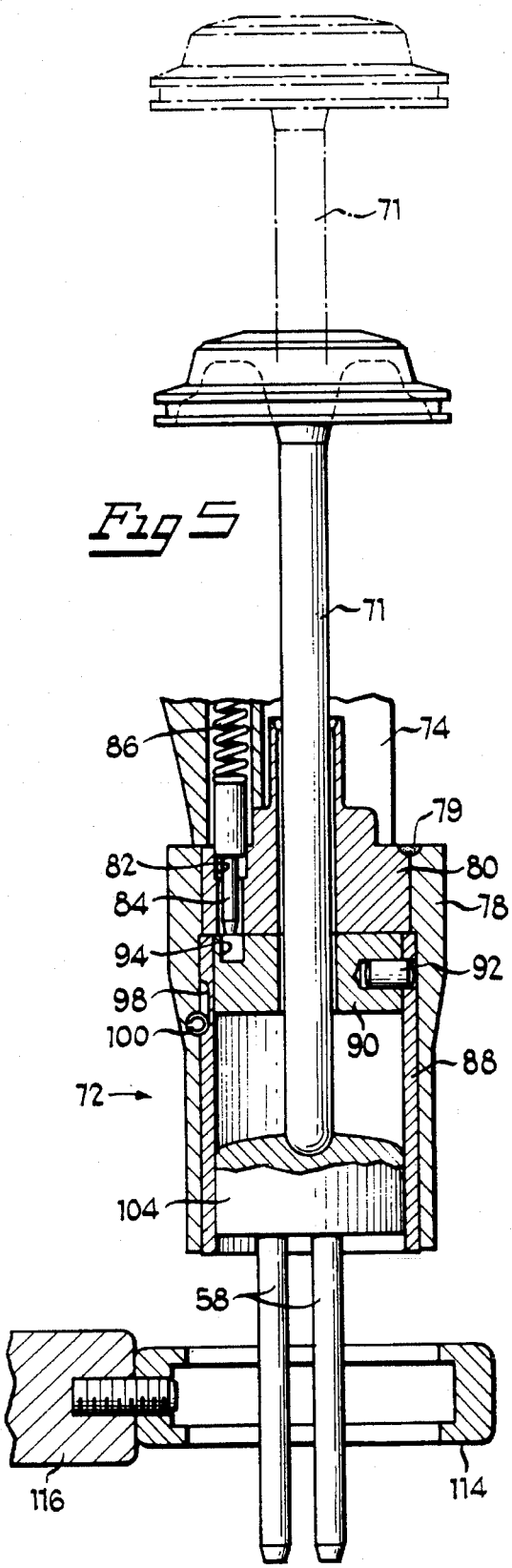

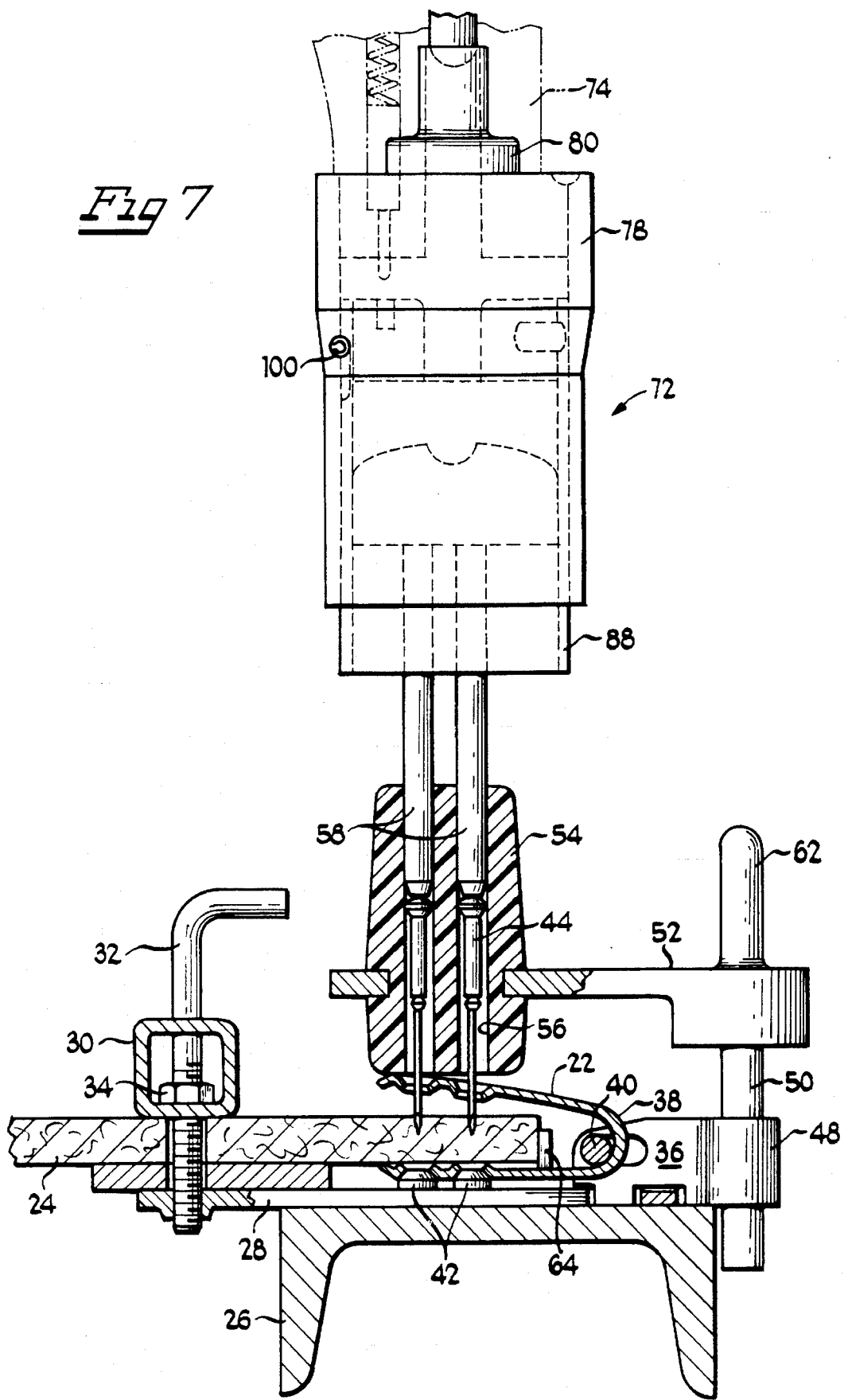

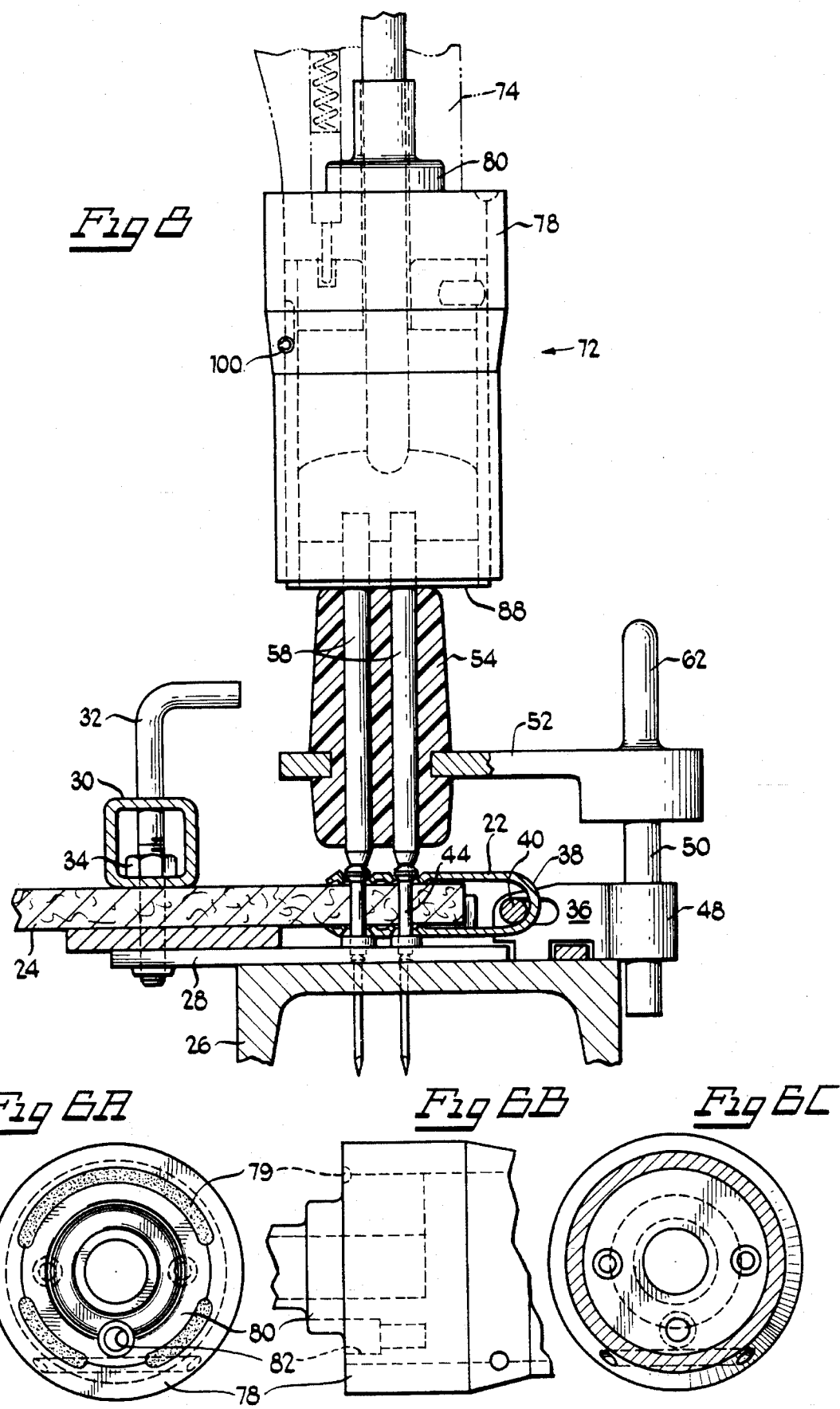

5,524,808

POWERED MULTIPLE RIVETER

This invention relates to the riveting of belt fasteners to the ends of conveyor belting or the like to form an endless belt, and more particularly to a powered driving arrangement for driving the self-setting nail-pointed rivets customarily used in this service.

As such, this invention represents the further development of a belt-fastener riveting system whose evolution is shown by U.S. Pat. Nos. 3,913,180, 4,620,657, and 4,688,711, owned by the assignee of this invention.

BACKGROUND OF THE INVENTION

Riveted sheet metal belt fasteners, whether of the plate or hinge forms, are typically produced as a strip of connected multiples divisible into five-rivet fasteners, which, as shown by Pat. Nos. 4,620,657 and 4,688,711, lend themselves to the gang-driving of all of the rivets of a given fastener section simultaneously. This is accomplished by the use of a multi-pronged driver whose multiple drive rods are insertable into a guide block forming part of a fixture in which the end of a belt, the unclenched fastener, and the rivets which will secure the fastener to the belt, are positioned for assembly by the driving and setting of the rivets.

The guide block is formed with multiple through holes which receive and position the rivets to enter the countersunk holes in the upper plate of the fastener section, and which guide the multiple drive rods of the multi-pronged driver to impact the rivet heads when the cap or head of the multi-pronged driver is in turn struck by a hand-held hammer, or by a power tool capable of delivering an impact to the driver head.

Driving and setting multiple rivets with a hand-held hammer requires strength and skill to deliver a square blow to the driver head, i.e., one which is centered upon the driver head without also exerting a side thrust tending to distribute unequally the force transmitted to the rivets being driven or set. Failure to strike squarely, a not infrequent occurrence in the driving and setting of the many rivets required across conveyor belts 24 to 48 inches in width, increases the number of blows required to drive and set the rivets, and stresses the driver head undesirably, shortening its life. The use of hand-guided power hammers to relieve the maintenance man of the physical burden of wielding a heavy, hand-held hammer is subject to the same alignment problems, all of which tend to increase the downtime of conveyors in use when belt breakages occur, as, for example, in underground mining, where belt repair must often be made under trying circumstances.

Attempts to improve the power-driving and setting of rivets for this service have thus far focussed upon the power-driving of each rivet singly, using a commercial bulk nailing gun for the purpose, as shown by U.S. Pat. No. 4,440,336. In the arrangement there shown, the nailing gun is secured to an arm hinged for vertical swinging movement on a carriage movable transversely of the belt to which the fastener is to be attached, the carriage being guided by ways secured to the upper surface of a bar clamp which secures the belt in the riveting fixture. An elongated gauge plate perforated with a hole pattern matching that of the belt fastener is positioned beneath the mounting arm of the gun, which is provided with a downwardly-extending feeler pin to find the holes in the perforated plate to position the gun to drive each nail-pointed rivet singly through the perforated plates of the belt fastener, and the belt in between, in a single discharge of the gun. The gun is then lifted, moved laterally to position the feeler pin in the next hole of the row, and the operation repeated. When one row of rivets has been driven, the swing arm of the gun is indexed on the carriage to align the feeler pin with the next row of holes in the perforated gauge plate for the driving of the next row of rivets, and again for the next row.

The elaborate and cumbersome fixturing required to position the gun in turn over each perforation of the fastener plate reflects the danger to personnel of the bouncing, deflected rivet that misses the hole. It appears to lack the flexibility needed for field repair of conveyor belts in situ, and is manifestly unable to drive multiple self-setting rivets simultaneously.

It is accordingly the object of this invention to improve the technique of gang-riveting in the stated context by the use of a hand-held power tool especially adapted for the simultaneous driving and setting of multiple nail-rivets.

SUMMARY OF THE INVENTION

The invention contemplates the revision of the nose piece of a power-operated impact tool such as those employed for the driving of nails singly, i.e., a "gun" in which the impact is delivered by the end of an axially driven rod, however powered. The nose piece contemplated is a cylindrical shell provided with an inner sleeve engageable with the work, and movable by such contact into the shell to operate the touch probe of the tool to condition the tool for the impact stroke when the operator depresses the trigger. The inner sleeve also supports a guide bushing for the extended drive rod of the tool, and serves as a close fitting housing to receive the head of a multi-pronged rivet driver in a sliding fit, that head being thereby aligned with, and formed for engagement at its center by, the complementarily-formed impacting end of the drive rod of the tool. The head of the rivet driver transmits the force of the drive rod impact to the head of the rivet driver axially of its multiple individual drive rods, so as to distribute that force equally among the individual drive rods.

BRIEF DESCRIPTION OF THE DRAWINGS

The invention is described in the following specification with reference to the accompanying drawings, in which:

FIG. 1 is a rear perspective view of a riveting fixture with the belt fasteners positioned therein to receive the end of the conveyor belt, not shown, and with a multiple-drive-rod rivet driver positioned in the guide block over one of the fasteners;

FIG. 2 is a plan view of the fixture with the driver removed and with the end of a conveyor belt inserted between the upper and lower plates of the fasteners, ready to receive the rivets to secure the fasteners to the belt;

FIG. 3 is an elevational view of a commercially available, air-operated nailing gun with the nose piece thereof modified thereof in accordance with the invention to accept and position the gun with respect to the multi-pronged rivet driver of FIG. 1;

FIG. 4 is an elevational view of the multi-pronged rivet driver, the head of which is partially sectioned to show the assembly of the individual driver rods therewith;

FIG. 5 is a fragmentary sectional elevation of the gun and nose piece of FIG. 3, illustrating the construction of the nose piece and its relation to the piston rod of the gun and of the latter to the head of the rivet driver at impact;

FIGS. 6A, 6B, and 6C are, respectively, top, fragmentary side, and bottom views of the nose piece of FIG. 5, absent the inner sleeve and guide bushing, to indicate the means provided to attach the same to the body of the tool;

FIG. 7 is an elevational view of the nose piece of the nailing gun poised over the assembly fixture for delivering a blow to the head of the rivet driver, shown partially inserted into the guide block of the assembly fixture with the individual drive rods poised over the rivets;

FIG. 8 is a view similar to FIG. 7 showing the belt fastener secured to the belt end, with the individual rivets set and with the drive rod of the gun fully extended, as though delivering the final blow to set the rivets;

FIG. 9 is a sectional elevational view of a self-setting nail-pointed rivet;

FIG. 10 is a similar view of a self-setting rivet after being set by the combined action of the suspended nail-point and the locator button beneath the rivet hole in the lower plate of the belt fastener; and FIG. 11 is a similar view of the rivet after being set.

DETAILED DESCRIPTION OF THE PREFERRED EMBODIMENT

Before describing the invention itself, it will be helpful to an understanding of the invention to refer to FIGS. 1 and 2 for a description of the setting in which the apparatus of the invention is employed.

FIG. 1 shows in rear perspective a belt-fastener fixture 20 in which open-jawed belt fasteners 22 are secured to receive the end of a belt 24 which is inserted between the upper and lower plates of the fasteners and clamped in position for assembly by the riveting of the fasteners to the belt.

The fixture 20 comprises a section of structural steel channel as a base 26, positioned with its flanges directed downwardly as legs. The web of the channel is overlaid with an anvil plate 28 which is extended forwardly to support a belt clamp 30. The clamp (FIG. 7) takes the form of a section of rigid, square steel tubing, having near each end a hand screw 32 whose threaded shank passes through holes in the upper and lower walls of the tube and into a tapped hole in the anvil plate 28. A hexagonal nut 34 within the tube, jammed at the upper end of the thread of the screw, applies the clamping force to the tube.

Along its rear edge (facing, in FIG. 1), the anvil plate is surmounted by spacer blocks 36 which extend between the connecting hinge loops 38 of belt fasteners 22 to receive an elongated hinge pin 40 passed through the hinge loops 38 to hold the belt fasteners in place for the assembly operation. Precise positioning of the belt fasteners is provided by hardened bushings 42 which are received in holes bored through the anvil plate 28 and base 26 to receive the nail points of the rivets 44 when driven (FIG. 8). The upper ends of the bushings 42 are flanged to support them in the holes in the anvil plate, and extend above the plate as chamfered heads which serve as locator buttons for countersunk rivet holes 46 in the lower plate of each belt fastener 22. A through hole in each bushing 42 is countersunk to support the countersink head of the nail point of the rivet 44, and the hole is encircled by a round-bottom trough (FIG. 10) to turn the hollow point of the rivet outwardly and upwardly against the countersunk surface 46 of the hole in the lower fastener plate.

Alternate spacer blocks 36 are extended rearwardly to provide base-overhanging slide bearings 48 for slide posts 50 of the holder plate 52 for the guide block 54.

The guide block 54 is an elongated relatively tall block of molded rubber having a multiplicity of cored holes 56 sized and spaced to receive the multiple drive rods 58 of a rivet driver 60. Those guide holes 56 and drive rods 58 are spaced in a pattern of five suggestive of the letter "W", in alignment with the like pattern of holes in both plates of the fasteners 22 (FIG. 2).

The guide block 54 is supported above the base 26 of the fixture by the holder plate 52 with its guide holes 56 in alignment with the button bushings 42 of the anvil plate 28. The holder plate 52 thickens along its rear edge to receive the two downwardly-extending slide posts 50 and an upstanding handle 62.

The elevation of the guide block 54 above the fixture base 26 is determined by the engagement of its underside with the upper plate or plates of the multiple fasteners 22, typically four, which it overlies. The guide block descends to the upper surface of the clenched and riveted fasteners as the last of the group of fasteners 22 is riveted closed. The holder plate 52 is then lifted and moved to another station for a repetition of the riveting process, which will be repeated several times across the width of the belt, which may vary from 24 to 48 inches in width.

The fasteners 22 are produced in a strip of connected multiples by stamping, piercing, and bending to provide individual overlying plates with aligned rivet holes countersunk to receive the countersink head of a rivet-nail in the upper plate, and, in the lower plate, the upset lower head of the rivet formed in the assembly process. A tab 64 upstruck from the lower plate of the fastener 22 provides a stop for the insertion of the end of the belt 24.

The individual fasteners 22 are connected together by tabs between their lower plates, with lines of weakness formed therein in the stamping process to accommodate the transverse flexing of the belt when loaded. For greater widths of conveyor belt, self-connected sets of multiple fasteners of convenient manufacturing width may be further joined with like sets by welding connecting wires thereto to assemble fasteners for extended belt widths.

For further details of the riveting fixture, the segmented fasteners, and the rivet-nails, reference may be had to U.S. Pat. Nos. 4,380,109, 4,625,369, and 4,688,711.

From the foregoing description, it will be appreciated that the field repair of conveyor belts is a tedious, tiring, and time-consuming task when performed solely by manpower. Even highly experienced and skilled maintenance personnel have difficulty in consistently wielding a four-pound mechanic's hammer with accuracy.

The power-riveter of the invention replaces raw manpower with a power-driven gang-riveter which is self-aligning with the head of the multi-pronged rivet driver, produces a more uniform riveted connection of belt and fastener, removes the tedium from the repair operation, and speeds the operation to reduce the downtime of the conveyor.

Referring initially to FIGS. 3, 4, and 5, the power tool 70 illustrated in FIG. 3 is a commercially available nailing gun, specifically the Aerosmith 90 Bulk Nailer, available from Aerosmith, Inc. of Phoenix, Ariz. The gun as shown is modified from the commercially available, nail-driving configuration by the removal of its nail magazine, the reconfiguration and remanufacture of its drive rod 71, and the substitution of the modified riveting nose piece 72, illustrated in detail in FIG. 5, for the regular work-contacting, nailing nose piece of the gun.

As there illustrated, the lower housing 74 of the gun 70, to which the nose piece 72 is attached by two cap screws 76

(FIGS. 3 and 6), is shown only in fragment to indicate its relation to the riveting nose piece 72 substituted for purposes of this invention.

The nose piece 72 comprises an outer cylindrical shell 78 which is closed at its upper end by an attachment fitting 80 which is press fit in the cylindrical shell 78, and secured therein after assembly by a weld 79 (FIG. 6A).

Housed within a stepped bore 82 in the attachment fitting 80, and aligned with a similar bore in the lower housing 74 of the gun, is the touch probe 84 of the gun. The touch probe is spring loaded from above by a compression spring 86 which normally extends the probe from the attachment fitting 80 to the extent permitted by contact of a shoulder on the touch probe with the restraining shoulder at the step of the bore through the attachment fitting 80.

Slidably contained within the outer shell 78 of the nose piece is an inner sleeve 88 which is closed at its upper end by a guide bushing 90, preferably of bronze, secured in the upper end of the sleeve by a dowel pin 92. The central bore of the bushing is relieved at its entering end to receive the ball nose of the drive rod 71 of the gun. As seen in FIG. 5, the bushing 90 is also provided with a hardened steel insert 94 positioned to engage the tip of the touch probe 84 and to lift the touch probe when the inner sleeve contacts the workpiece, in this case the guide block 54 of the assembly fixture. This conditions the gun for firing when the finger trigger 96 is depressed.

Limited sliding movement of the inner sleeve 88 within the outer shell 78 is assured by milling a flat 98 on the outer surface of the inner sleeve, extending axially thereof to the extent of the desired permissible telescopic motion of the sleeve within the shell. The flat 98 bears against a roll pin 100 inserted in a chordally disposed hole 102 in the outer shell 78. Thus, while the roll pin 100 permits limited telescopic movement of the inner sleeve 88 within the outer shell 78, it prevents relative rotation of the two cylindrical shells and maintains the alignment of the hardened insert 94 with the touch probe 84 of the gun. The provision of the inner sleeve 88 as an effective extension of the touch probe of the gun renders its operation independent of the rotative position of the gun with respect to the guide block 54.

Received within the inner sleeve 88, in a free sliding fit of about 0.004"on a diameter of 1¾ inches is the head 104 of the multi-pronged rivet driver 60.

As shown separately in FIG. 4, the multiple lesser drive rods 58 of the rivet driver are knurled at their upper ends for press fit into blind holes in the driver head 104, and are steadied in that assembled relation by a retaining block 106 of hard elastomeric material retained within a cavity 108 in the lower portion of the head. The elastomeric material is preferably formed as a premolded block pressed into the downwardly facing cavity 108 of the driver head, the walls of which taper to a reduced diameter at the mouth of the cavity to retain the compressible block 106 in assembly with the rods 58 and the head 104.

In preferred form, the top of the head 104 of the rivet driver 50 is provided with a central depression 110 of hemispherical form, as shown in FIGS. 4 and 5, and the drive rod 71 of the gun is ball-nosed to seat itself in the matching depression 110 of the driver head. This self-aligning configuration of the impacting end of the drive rod 71 of the gun and the matching configuration of the head 104 of the rivet driver is not only most helpful in distributing the force of the impact uniformly to the lesser rivet drive rods 58, it significantly reduces the erosion of the normally flat end of the drive rod 71 from chipping, and the ultimate breakages of the drive rod from its piston, thought due to the off-center load occasioned by the eroded end of the drive rod.

In addition to the ball-and-socket relationship of the drive rod end to the head of the rivet driver 104, the drive rod and the piston of the gun are made of a low-carbon, high-nickel, maraging steel. The piston and drive rod may be turned as an integral piece from a bar of such steel, but may also be made more economically by machining the drive rod and piston separately, and then welding the rod and piston together, as by friction welding.

The machining of the part or parts, in either case, is done with the steel in the annealed state, i.e., before the final tempering or "aging" to develop the high strength, hardness, and toughness that characterizes maraging steels, whose dimensional stability during aging is such as to require no further machining of the drive rod and piston after aging.

The guide bushing 90 in the upper end of the inner sleeve 88 helps to avoid or reduce the fatigue stresses which can be induced in the drive rod at its juncture with the piston, by vibratory flexure of the drive rod. The bushing confines the leading end of the drive rod at impact and tends to resist the side thrust upon the nose of the driver from any chance misalignment with the receiving depression in the head 104 of the rivet driver. With the lateral confinement of the leading end of the drive rod 71 by the bushing 90 at time of impact, as well as at its midpoint by the guide bushing provided by the gun maker as an integral part of the lower housing 74 of the gun, and at its upper end by the piston itself, the rod breakage failures experienced early on in the development of this invention have been overcome.

The effects of slight misalignment of the drive rod 71 and the depression 110 of the river-driver head 104, which may result from necessary clearances and from manufacturing tolerances, are accommodated by forming the rivet-driver head 104 of a malleable steel in which the hardened drive rod 71 can peen a satisfactory fit in a relatively short time.

In use, the self-setting rivets, usually five in number for each fastener, are inserted into the guide bores 56 of the guide block of the assembly fixture, followed by the multi-pronged rivet driver 60 which is also inserted by hand, if necessary pushing the nail points of the self-setting rivets down into contact with the belt end inserted into the fixture and into the gaping belt fasteners. The nose piece 72 of the gun is then placed over the head of the rivet driver 60 and lowered toward the fixture 20 until stopped by the contact of the inner sleeve 88 with the guide block 54 of the fixture at one end, and by its contact with the attachment fitting 80 of the nose piece at the other. With the raising of the inner sleeve 88 within the outer sleeve 78 of the nose piece, the touch probe 84 of the gun is lifted by the insert 94 in the bushing 90 and the gun thereby readied for firing when the finger trigger 96 is pulled.

Depending upon the extent of insertion of the rivet driver 60 into the guide block 54 of the assembly fixture, the inner sleeve 88 may also be lifted by the contact of the bushing 90 with the driver head 104, and in that manner lift the touch probe 84 to condition the gun for firing for the initial rivet-driving impact, after which the actuation of the touch probe will typically be effected by the contact of the inner sleeve 88 with the guide block 54 of the fixture, as initially described.

This suggests a simplified alternative form of nose piece in which the inner sleeve 88 and guide bushing 90 are eliminated and the inner bore of the outer shell 78 sized to the rivet-driver head 104. In such alternative form, the rivet-driver head 104 would engage and activate the touch probe 84 directly, but the outer shell would require foreshortening to ensure the activation of the touch probe throughout the travel of the rivet driver, i.e., before the shell 88 can engage the upper surface of the guide block 54.

The preferred form, using the inner sleeve 88 and, with it, the guide bushing 90, provides a more complete and deeper enclosure of the rivet driver head which not only ensures encapsulation of the collision of the drive rod of the gun with the head of the rivet driver, but also improves the alignment of those two elements by the provision of the guide bushing 90 of the inner sleeve 88.

Using the Aerosmith 90 Bulk Nailer above referred to, five nail-pointed rivets are typically driven and set in about four to five seconds with from 6 to 10 blows of the drive rod 71, the number depending upon the resistance of the belt material to penetration, and also upon the available air pressure for its operation, which is preferably in the range of from 55 to 60 psi gauge at the gun. As this pressure level is typically somewhat below the pressure levels regularly available for other purposes in mine operation, a pressure regulator 112 is provided in the supply line to the gun 70, as indicated diagrammatically in FIG. 3, along with a pressure relief valve 113, preset for a maximum operating pressure of 65 psig.

An optional, slidably removable handle ring 114 surrounds the outer cylindrical shell 78 of the nose piece 72 (FIGS. 3 and 5), the short conical section of which limits the upward slide of the ring 114. A handle 116 screwed into a tapped radial hole in the ring 114 serves as a set screw, to secure the handle 116 in any desired position of adjustment, radially or longitudinally of the nose piece, that may suit the convenience of the operator in guiding the nose piece 72 onto the rivet driver 60.

As seen in FIGS. 7 and 8, the expendable nail points of the rivets guide the rivets through countersunk holes in the upper plate of the fastener 22 and through reversely countersunk holes in the bottom plate of the fastener, which is positioned over the hardened locator buttons 42 in the anvil plate 28. These hardened buttons are provided with through holes (FIG. 10) which receive and pass the shank of the nail points of the rivets, but block and hold the heads of the nail points, as seen in FIGS. 8 and 10. The heads of the nails initially flare the lower hollow end of the rivet and then the locator buttons do the final curling and formation of the lower rivet head. More specifically, a trough-like depression surrounding the through hole of the hardened anvil button curls the flared hollow rivet end into contact with the countersunk undersurfaces of the holes in the bottom plate of the fastener 22.

The procedure preferably followed is to drive the nail points of a set of self-setting rivets through the upper plate, belt, and lower plate of the fastener at one end of the fixture, i.e., at one side edge of the belt, and then similarly driving the set of rivets at the opposite side edge of the belt, moving the guide block 54 as may be necessary for the purpose. A single "shot" of the gun 70 will usually drive the nail points through the fastener plates and sandwiched belt and bend the upper fastener plate down into contact with the belt. In a belt of typical width, i.e., 24 inches and greater, it is also desirable to drive the nail points of the rivets of a fastener at or near mid-width of the belt, without setting the rivets, and then doing the same for the rivets of all intermediate fasteners. Finally, all rivets are set in any desired or random order across the width of the belt. This procedure anchors the belt to the fixture against any tendency toward a skewing dislodgment of the belt from the fixture clamp as a result of the pounding of the tool.

The arrangement described removes the elements of manual force and skill in the wielding of a heavy hammer to drive and set the multiple rivets of a belt fastener, and the attendant possibility of damage to the fixture and breakage of the multi-pronged drivers due to inaccurate wielding of a hand-held hammer. This, of course, varies with the skill of the operator, a factor which can be much affected by fatigue. The impact of the power-operated drive rod 71 in unerring alignment with the rivet-driver head 104 not only equalizes the distribution of force to the multiple lesser rivet drive rods 58, it extends the life of the rivet driver. It similarly produces a uniform riveting result in clenching the fasteners onto the belt, and accomplishes the repair in minimal time in a setting where unavoidable downtime for repair has been a serious limiter of production.

While the invention has been described in connection with a particular commercially available, air-operated nailing gun, it is believed readily applicable to other commercially available guns of that general type, whether the driving force be provided by compressed air, by internal combustion, or by electrical power.

The features of the invention believed new and patentable are set forth in the following claims.

What is claimed is:

1. Apparatus for driving and setting multiple nail-pointed rivets pre-installed in through bores of a guide block by transmitting a blow simultaneously to a plurality of rivets in the guide block to attach belt fasteners to the ends of conveyor belts, comprising in combination:

a power operated impact tool having a drive rod with an impact transmitting end for delivering a blow with the end of the drive rod when the drive rod is propelled axially from a body of the tool;

said tool having a nose piece in the form of an open-ended cylindrical shell which defines a concentric space around the drive rod when extended for collision contact, and a multi-pronged rivet driver having a common head and a cluster of parallel lesser drive rods which are aligned with the guide block through bores secured at one end to the common head;

said common head having a cylindrical cross-sectional configuration for insertion into said shell axially thereof to position said head to receive a blow from the drive rod of the tool;

a cylindrical guiding surface in the shell to guide the cylindrical head for straight line travel in the shell, and configured impact surfaces on the end of the drive rod and the configured head to distribute and to transfer the energy thereof axially to said lesser drive rods of the rivet driver in alignment with the guide block through bores to drive the rivets therein for attaching a belt fastener to a belt end therebetween;

said tool also having a touch probe positioned to be actuated by the relative movement of the tool and the rivet-driver head when received in said shell;

said tool being activated to propel said drive rod into said shell upon the concurrent actuation of said touch probe and a trigger remote from the nose of the tool.

2. The apparatus of claim 1 in which said cylindrical guiding surface comprises a sleeve normally protruding from the open end of the shell and having limited telescopic sliding motion within said shell;

said touch probe extends into said space within the shell and is positioned to be actuated by the inward motion of the sleeve;

wherein said common head of said multi-pronged rivet driver has the cylindrical cross-sectional configuration adapted for insertion into said sleeve axially thereof in sliding contact with the inner surface of the sleeve.

3. The apparatus of claim 1 wherein the power-operated impact tool includes an upper portion and a lower portion with the shell disposed on the lower portion and the trigger for causing the drive rod to deliver the blow disposed on the upper portion and including a transverse handle secured at the lower portion of the impact tool to allow an operator to manually orient the tool vertically with one hand on the trigger and the other on the lower handle to guide the tool and shell onto the rivet driver.

4. The apparatus of claim 2 in which the head of said multi-pronged rivet driver has a central hemispherical depression to receive the blow from the drive rod of the tool, and a piston fixed to an upper end of the drive rod of the tool with the drive rod having a ball-nosed end fitting within said depression of the rivet driver head to prevent breakage of the drive rod from the piston and chipping of the end of the drive rod.

5. The apparatus of claim 4 wherein a bushing is provided in the sleeve and has said cylindrical guiding surface thereon for receiving and guiding the drive rod of the tool into contact with the head of the rivet driver and acts as said touch probe.

6. The apparatus of claim 5 wherein the sleeve is cylindrical but restrained from rotation within said shell by interengaged means on said sleeve and shell which also limit said telescopic sliding motion, said bushing being formed of bronze and having therein a hardened steel insert to engage and actuate the touch probe of the tool.

7. The apparatus of claim 5 wherein the drive rod of the tool is formed of hardened maraging steel, the head of the rivet driver is formed of malleable steel, and the guide bushing in said sleeve is bronze.

8. An apparatus for driving and setting multiple rivets pre-inserted in through bores of a guide block by transmitting a blow simultaneously to a plurality of rivets in the guide block to attach belt fasteners to the ends of conveyor belts, comprising in combination:

a power-operated impact tool for generating a propelling force;

a drive rod mounted in the tool and propelled thereby;

a shell attached to the tool and into which a portion of the drive rod is propelled;

a rivet driver including an enlarged head and a plurality of lesser drive rods mounted to the head, the head having a cross-sectional configuration adapted to be removably inserted into the shell to receive a blow from the drive rod portion and transfer the energy to the lesser drive rods;

a guide block having a plurality of bores to hold rivets aligned with openings in the belt fasteners, the drive rods on the rivet driver movable into the bores in the guide block to abut the rivets and to align the rivets in the bores; and a guiding surface in the shell configured to receive the enlarged head for guiding the head for straight line travel in the shell, and impact surfaces on the end of the drive rod and the head to distribute and to transfer the energy thereof axially to said lesser drive rods of the rivet driver in alignment with the guide block through bores to drive the rivets therein for attaching a belt fastener to a belt end therebetween.

* * * * *